April 27, 1948.                R. A. MYERS                2,440,376
                              MOLDING MACHINE
                          Filed Aug. 23, 1946

Inventor
Richard A. Myers
By
Richmond L. Hayes
Attorney

Patented Apr. 27, 1948

2,440,376

UNITED STATES PATENT OFFICE 2,440,376

MOLDING MACHINE

Richard A. Myers, Warren, Pa., assignor to Warren Plastics Corporation, Warren, Pa., a corporation of Delaware Application August 23, 1946, Serial No. 692,639

4 Claims. (Cl. 18—20)

1

This invention relates to improvements in automatic turret type machines for the molding of articles of plastic materials and is more particularly directed to structure utilized, on completion of a molding cycle, to loosen and remove a molded article from the mold element on which it has been formed.

As is well known, it is entirely practical to produce small molded articles in large quantities through the use of automatic sequential molding machines. A most practical type of machine for this purpose is the so-called "turret-type" wherein a multiplicity of molds are mounted on a revolvable unit, one complete revolution of the unit serving to complete the cycle through which a given mold must pass to produce a molded article. Such a machine is substantially automatic in operation; that is, means is provided for automatically filling the mold cavity and for closing and opening the mold elements as required. In the case of hollow molded articles there is a tendency, on the completion of a molding operation, for a molded piece to adhere to the force on which it is formed. If the interior of the molded piece is smooth-surfaced, no particular difficulty is encountered in its removal when the elements of the mold have been separated to an extent to expose such piece. However, there are many other molded articles which are formed with undercuts, threads, etc., and such articles are not as readily removed from the mold force and require means for both loosening the molded piece and then removing it from the force. It is with this latter type of molded article, and its loosening and removal from the force of a mold, that the invention is more particularly concerned.

For purposes of illustration, the invention is shown applied to an automatic, sequentially operated, turret type machine for the compression molding of internally threaded bottle caps, the machine being substantially of the type shown and described in the copending application of David Cropp, Serial No. 604,762.

It is an object of the present invention to provide mechanism for automatically loosening and removing molded pieces from an automatic turret type molding machine.

It is another object of the invention to provide a loosening and removing mechanism that is adapted to automatically act on successive molded pieces as such pieces, during operation of the machine, are exposed upon separation of the elements of each mold.

It is a further object of the invention to pro-

2 vide mechanism with which an internally threaded molded piece is adapted to contact to first break the seal or adherence as between the molded piece and its carrying mold element and, secondly, fully unthread such piece from the threaded force of the carrying mold element.

Other objects and advantages will be more fully understood from a consideration of the following specification, taken in conjunction with the accompanying drawing; and in which Fig. 1 is a front elevational view of a portion of an automatic, sequential, turret type molding machine to which is applied a mechanism embodying one form of the invention;

Figure 1:
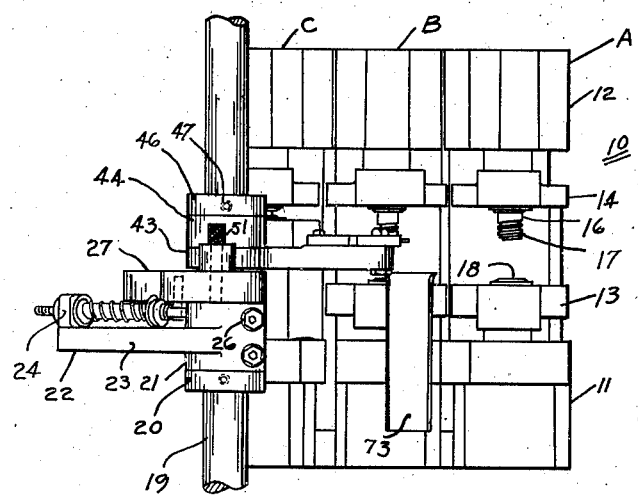

Referring more particularly to the drawing, the reference numeral 10 is employed to generally designate a portion of an automatic turret type molding machine to which one form of the present invention is applied. The machine includes a turret 11 mounted to revolve about a vertical axis, and mounts a multiplicity of molding units 12 located in close proximity about the circumference of the turret. Each molding unit consists of a pair of elements 13 and 14. In the type machine shown the element 14 is stationary and, since the present invention particularly illustrates means for loosening and removing an internally threaded piece, such as a bottle cap, the force 16 is formed with threads 17. The element 13 includes a cavity 18 for receiving the plastic material, as well as the force 16. Through suitable mechanism, such as shown and described in the copending application mentioned above, the element 13 is movable into and out of closing position with respect to the element 14.

The loosening and removing mechanism constituting the invention is shown to be mounted on a stationary upright or rod 19. For convenience in locating the mechanism, a collar 20 may be fixed at the desired height on the rod 19. This collar serves to position the sleeve 21 of a bracket 22 on the rod. The bracket includes an arm 23, at the end of which is an upright flange 24. The sleeve, as suggested by screws 26, is fixed, in any desired position, against movement on the shaft 19. A swivelable member 27 is mounted on the rod 19 and rests upon the sleeve 21. This member includes a lateral extension 28. Near one edge of this extension is a downwardly opening hole or aperture 31, and a further aperture 32 is located near the other edge. A shaft 33 projects through an opening in the flange 24, and an enlarged portion 34 thereof is fitted with a compression spring 36. One end of this spring abuts the flange 24, whereas the other end engages a collar or shoulder 37. Beyond the shoulder 37 the shaft may be of reduced diameter, substantially as indicated at 38, and this portion projects into and is firmly attached to the support 39 of a pin 41. Since the plane of the shaft 34 is beneath the plane of the member 27, the pin 41 is projectable upwardly into the opening 31 of said member. A collar or nut 42 is mounted on the threaded end of the shaft 33. This collar serves as an adjustable stop to axial movement of the shaft in one direction, through contact with flange 24.

Directly above the member 27 there is located a further swivelable member 43. This member includes a hub 44, having an opening of a diameter to mount it on the rod 19. Although this member is freely rotatable about the rod, it is prevented from vertical displacement from its position in contact with the member 27 by means of a collar 46, located thereabove on the rod and fixed by means of a set screw 47. The member 43 includes arms 48 and 49 which are in a common plane. The end of arm 48 is apertured to receive a pin 51 of sufficient length and proportions to project beneath this arm into the aperture 32 of the extension 28. In this manner member 43 may be so joined to member 27 that, during operation of the mechanism, these parts will rotate as one about rod 19.

Figures 4, 5, 8:
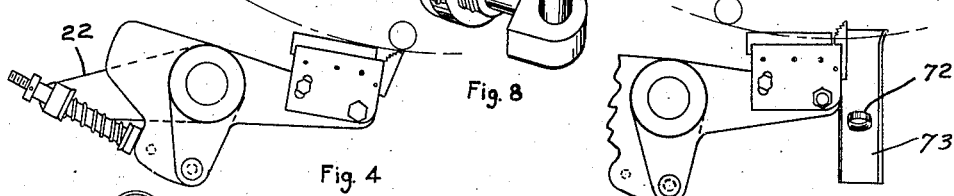
Fig. 4 is a view similar to Fig. 2 showing the position of the parts of the mechanism during the operation of unscrewing the molded piece and following the loosening operation.
Fig. 5 shows the position of the parts of the mechanism upon completion of the unscrewing operation, the loosened and removed piece being shown entering a removal chute.
Fig. 8 is a fragmentary perspective view of the tensioning portion of the mechanism.
Figures 6, 7:
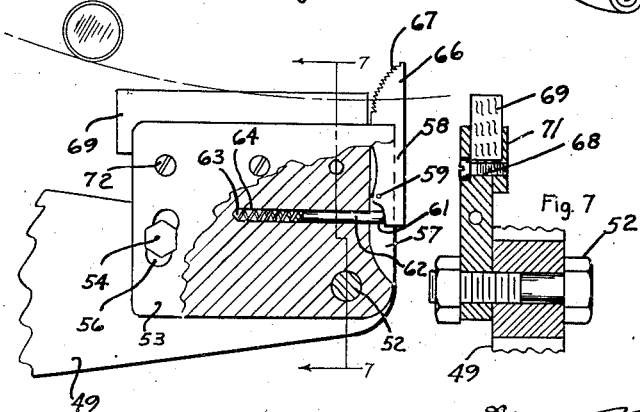
Fig. 6 is an enlarged fragmentary top plan view of the mechanism in position of rest, parts being broken away and sectioned to illustrate certain of the structural details.
Fig. 7 is a transverse sectional view taken substantially on the line 7—7 of Fig. 6.

From the drawing it is evident that arm 49 is somewhat elongated and that its free end is fitted with a transversely disposed bolt 52. This bolt is of sufficient length to project beyond the upper surface of the arm and mount one end of a block 53 for pivotal movement. A stud 54 projects through a slotted opening 56 in the block remote from the bolt 52 and serves to secure the block 53 at a desired angle with respect to arm 49 within, of course, the limits of the slot 56. That end of the block adjacent the bolt 52 is formed with a narrow slot 57 that is of substantially the proportions and contour shown in Fig. 6 of the drawing. Of course this slot is open at its outer end, thus enabling locating a trigger 58 therein. Within the slot the trigger is pivotally joined to the slot side walls through a pin 59. Beyond the pin 59 is a shoulder 61 that is contacted by a pin 62, located in an opening 63 in the block 53. A spring 64 urges pin 62 outwardly of this opening into engagement with shoulder 61, thus causing the trigger 58 to normally occupy the position shown in all but Fig. 4 of the drawing. The exposed end 66 of the trigger includes a curved area formed with a series of teeth 67. As may be seen in Figs. 6 and 7, the upper edge of the block 53 is formed with a substantially full length ledge 68, on which is seated a friction bar 69. This bar is held in place on the ledge by a clamping plate 71, suitable screws 72 being provided to draw the plate 71 into pressure engagement with the bar 69.

Operation of the above described mechanism is hereinafter set out to more clearly bring out the particular structural advantages thereof. In Fig. 1 of the drawing the elements 13 and 14 of mold unit A are fully separated, the molded article removed, and the cavity 18 approximately in a position to receive a fresh charge of moldable material. The elements of mold B are also fully separated, the molded article having just been removed from the force 17, the parts of the loosening and unthreading mechanism being in the position shown in Fig. 5, wherein a molded article 72 has dropped into a removal chute 73. The elements of the mold C have started to separate for the purpose of exposing the article 72 in its position on the force 17. From these views of several of the molds, it will be clear that the loosening and unthreading mechanism functions while the turret 11 is moving from approximately the position of mold C to the position of mold B. As indicated in several views of the drawing, the bar 69 and the serrated or toothed end 66 of the trigger 58 are in the plane of the force 17. The nut 42 has been adjusted to allow the expanding action of spring 36 to move shaft 33 to an extent to so position member 27 and member 43 that bar 69 and trigger end 66 will be in the horizontal path of travel of the cap carried by force 17 (see Fig. 2). When the mold element 13 has moved downwardly to expose cap 72 carried by the force of mold element 14, said cap moves into contact with an edge of bar 69. Of course, the cap cannot move out of its prescribed path of travel and, consequently, the swivel members 28 and 43 must move about rod 19. This movement compresses and increases the tension of spring 36 with the result that as the cap 72 slides along the friction surface of the bar, it is slightly rotated in a direction to unscrew the cap from the force. In practice, the sliding pressure contact of the friction bar 69 with the cap is of such extent and duration that the cap has only been loosened and rotated slightly from the position it occupied on the completion of the molding operation. Fig. 3 of the drawing illustrates the cap during this step of the operation and comparison of this figure with Fig. 4 indicates that as the turret 11 continues movement, the loosened cap contacts the serrations or teeth 67 of the trigger end 66. Continued movement of the cap pivots this trigger to the position of Fig. 4 against tension of spring 64. During this movement, the cap is slightly further rotated in an unthreading direction and, as the cap passes the end of the pivoted trigger, the trigger snaps back into its original position, thus giving a spinning action to the cap, completing the unthreading operation from the force and allowing the cap to drop into the delivery chute 73.

Figure 2:
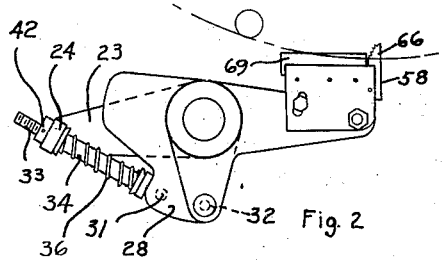
Fig. 2 is a top plan view of one form of the invention in inoperative position and prior to contact of a molded piece with that portion of the mechanism adapted to loosen it.
Figure 3:
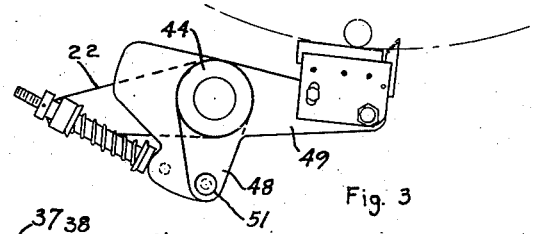
Fig. 3 is a view similar to Fig. 2 showing the position of the mechanism during the operation of loosening the molded piece.

As soon as trigger 58 has been passed by and completed unscrewing a given cap, the members 28 and 43, at the urging of spring 36, return to the position of Fig. 2, thus bringing the friction bar 69 and trigger end 66 into the path of the next molded cap when it is exposed by separation of a succeeding pair of mold elements. It is possible to apply greater or lesser pressure of the friction bar 69 on an exposed cap as may be found most suitable for a particular type of cap or other article being molded. To illustrate, it might be found desirable to increase the pressure of the bar should the cap be formed with a smooth or comparatively smooth circumferential surface. Additionally, other moldable articles or caps might require a longer period of frictional pressure contact to break the seal or tendency of the cap to adhere to the force. This may be accomplished by resetting the block 53, providing a somewhat longer friction bar 69, or further adjustment through rotation of nut 42 of the pivotable arm 49, or possibly some combination of these individual adjustments or changes.

It will be particularly noted that the mechanism above described is self-contained; that is, it may be mounted or removed in its entirety and depends for its function on no other operating mechanisms. Furthermore, it is so designed that it will operate to first loosen and then unthread a cap from the force of the mold without damage.

Although applicant has shown and described only one form of his invention in connection with the loosening and unthreading of a bottle cap from a threaded force on which it has been molded, it will be apparent that the mechanism may be modified not only to automatically remove caps of different size, but other molded articles as well, and such modifications are therefore considered as being within the spirit and scope of the invention insofar as they are set out in the annexed claims.

Having thus set forth my invention, what I claim as new and for which I desire protection by Letters Patent is:

1. In a molding machine having a rotatable turret, a plurality of pairs of complemental mold elements carried by said turret, and means operable to separate each pair of elements on the completion of a molding cycle to expose a molded article on its carrying element; a mechanism for the successive removal of molded articles from their carrying elements comprising a swingable member mounted on a stationary part of said machine, a plane surfaced friction block, said block being fixed to the edge of said member adjacent said turret, means yieldingly urging said member into a position to bring said block into the path of travel of an exposed molded article, each exposed article being adapted to have such pressure contact with said block as to break the seal of adherence of the article with its carrying element, and other means on said member engageable with each loosened article and operable to effect removal from the carrying element.

2. In a molding machine having a rotatable turret, a plurality of pairs of complemental mold elements carried by said turret, and means operable to separate each pair of elements on the completion of a molding cycle to expose a molded article on its carrying element; a mechanism for the removal of a molded article from its carrying element comprising a swingable member mounted on a stationary part of said machine, one edge of said member having a friction surface, means urging the surface of said member into the path of an exposed molded article to be contacted by and rotate said article to an extent to break its seal of adherence with the carrying element, and a trigger member adjacent said surface, carried by said swingable member and positioned to be normally in the path of travel of a loosened molded article, said trigger member being adapted to contact and rotate a loosened article to an extent to effect its removal from a carrying element.

3. In a molding machine having a rotatable turret, a plurality of pairs of complemental mold elements carried by said turret, and means operable to separate each pair of elements on the completion of a molding cycle to expose a molded article on its carrying element; a mechanism for the removal of a molded article from its carrying element comprising a swingable member mounted on a stationary part of said machine, one edge of said member having an elongated article contact surface means yieldingly urging said member into a position to effect such sliding contact of an exposed molded article with the surface thereof as to break the seal of adherence of said article with its carrying element, and additional yieldable means on said member positioned to engage a loosened article and operable to effect removal thereof from the carrying element.

4. In a molding machine having a rotatable turret, a plurality of pairs of complemental mold elements carried by said turret, and means operable to separate each pair of elements on the completion of a molding cycle to expose a molded article on its carrying element; a mechanism for the successive removal of molded articles from their carrying elements comprising a swingable member mounted on a stationary part of said machine, means yieldingly urging said member into the path of travel of an exposed molded article, a block on said member having a plane surface adapted to have contact with an exposed article, said block being proportioned to have sufficiently protracted contact with said article as to break the seal of adherence of the article with its carrying element, a spring actuated trigger on said member, said trigger being positioned to contact and effect removal of a loosened article from its carrying element.

RICHARD A. MYERS.

REFERENCES CITED

The following references are of record in the file of this patent:

UNITED STATES PATENTS

| Number | Name | Date |
| --- | --- | --- |
| 2,155,316 | Lauterbach | Apr. 18, 1939 |